United States Patent
Creta et al.

(10) Patent No.: US 6,976,129 B2
(45) Date of Patent: Dec. 13, 2005

(54) MECHANISM FOR HANDLING I/O TRANSACTIONS WITH KNOWN TRANSACTION LENGTH TO COHERENT MEMORY IN A CACHE COHERENT MULTI-NODE ARCHITECTURE

(75) Inventors: Kenneth C. Creta, Gig Harbor, WA (US); Manoj Khare, Saratoga, CA (US); Lily P. Looi, Portland, OR (US); Akhilesh Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 10/261,944

(22) Filed: Sep. 30, 2002

(65) Prior Publication Data
US 2004/0064652 A1 Apr. 1, 2004

(51) Int. Cl.[7] .................................... G06F 12/00
(52) U.S. Cl. ................... 711/141; 711/146; 711/210; 707/201
(58) Field of Search .................. 711/141, 146, 210; 710/201

(56) References Cited

U.S. PATENT DOCUMENTS 6,065,077 A * 5/2000 Fu ............................. 710/100
6,457,087 B1 * 9/2002 Fu ............................. 710/305
6,487,643 B1 * 11/2002 Khare et al. ................ 711/150
6,681,293 B1 * 1/2004 Solomon et al. ............ 711/122
2002/0178210 A1 * 11/2002 Khare et al. ................ 709/107

OTHER PUBLICATIONS

Jim Handy, The Cache Memory Book, 1998, Academic Press, Second Edition, pp 157.*
Jim Handy, The Cache Memory Book, 1998, Academic Press, Second Edition, pp 156-157.*

* cited by examiner

*Primary Examiner*—Donald Sparks
*Assistant Examiner*—Bao Q Truong
(74) *Attorney, Agent, or Firm*—Blakely, Sokoloff, Taylor & Zafman LLP

(57) ABSTRACT

A method and apparatus for a mechanism for handling i/o transactions with known transaction length to coherent memory in a cache coherent multi-node architecture is described. In one embodiment, the invention is a method. The method includes receiving a request for a current copy of a data line. The method further includes finding the data line within a cache-coherent multi-node system. The method also includes copying the data line without disturbing a state associated with the data line. The method also includes providing a copy of the data line in response to the request. The method also includes determining if the data line is a last data line of a transaction based on a known transaction length of the transaction.

21 Claims, 10 Drawing Sheets

MECHANISM FOR HANDLING I/O TRANSACTIONS WITH KNOWN TRANSACTION LENGTH TO COHERENT MEMORY IN A CACHE COHERENT MULTI-NODE ARCHITECTURE

BACKGROUND OF THE INVENTION

1. Field of the Invention

The invention relates to communications between integrated circuits and more specifically to data transfer and coherency in a multi-node or multi-processor system.

2. Description of the Related Art

Processors and caches have existed since shortly after the advent of the computer. However, the move to using multiple processors has posed new challenges. Previously, data existed in one place (memory for example) and might be copied into one other place (a cache for example). Keeping data coherent between the two possible locations for the data was a relatively simple problem. Utilizing multiple processors, multiple caches may exist, and each may have a copy of a piece of data. Alternatively, a single processor may have a copy of a piece of data which it needs to use exclusively.

Difficulties in multi-processor systems may arise when the system sends data to the input/output (I/O) subsystems. A multi-processor system may be optimized for transfer of small amounts of data between a processor and memory. Such data transfers may be done on an ongoing basis, and have well-known tendencies toward temporal and spatial (address) locality. However, data transfers to and from I/O subsystems tend to be less frequent and have larger size. Moreover, data transfers between processors and I/O subsystems also tend to have different locality characteristics, if they have any characteristics at all. Thus, handling data transfers between processors and I/O subsystems in multi-processor systems may be a useful ability.

BRIEF DESCRIPTION OF THE DRAWINGS

The present invention is illustrated by way of example and not limitation in the accompanying figures.

DETAILED DESCRIPTION

Figure 1:
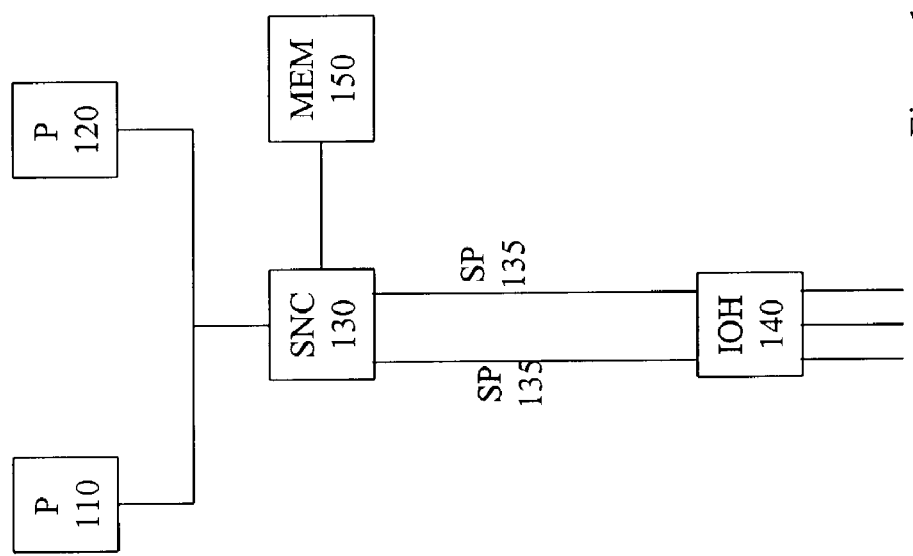
FIG. 1 illustrates a block diagram of an embodiment of a system having multiple processors.

A method and apparatus for a mechanism for handling i/o transactions with known transaction length to coherent memory in a cache coherent multi-node architecture is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

A coherent data architecture should reduce conflicts between nodes within the architecture which need to read and write data at about the same time. For example, processor (or node) A may be utilizing a first data line for purposes of a calculation at the same time an I/O subsystem may need access to the first data line. The IOH or I/O Hub in some systems functions as a bridge between a coherent system (including processor and memory subsystems) and a non-coherent system (including mass storage devices and user I/O devices for example). The mass storage devices which access data through the IOH (such as a disk drive controller for example) may be expected to access data without the usual temporal locality common in processor data accesses. Namely, once a given data line is accessed by the mass storage device, it is unlikely that the given data line will be accessed again soon by the mass storage device. Thus, some of the incentive for caching in a processor subsystem is not present when handling memory accesses for a mass storage device.

I/O subsystems may thus be expected to not keep data lines in an associated cache for long periods of time. As such, the I/O subsystem can often work with a snapshot of the requested data rather than working with an exclusive copy of the data during the entire I/O process. As a result, a read current operation may be implemented to allow an I/O system to obtain a coherent copy (coherent at the time the data is read) of a data element while allowing the rest of the system to continue using the data element as if it had not been accessed by the I/O system.

As will be appreciated, I/O systems or subsystems also typically operate on large portions or chunks of data relative to a single line. Knowing the transaction length of a transaction between an I/O system and a cache or other part of memory can be used in conjunction with the read current operation to achieve more efficient use of system bandwidth and I/O bandwidth. An I/O device may operate on a page basis for example, resulting in numerous cache lines being written or read at any given time.

With a known transaction length, an I/O hub may begin requesting lines in a read current manner and temporarily store those lines in a buffer for example. The I/O hub may request all of the lines in the transaction in a read current manner, and then service the I/O device, using the snapshot of the system provided by the data from the read current request(s). As these requests may be made in parallel to the system, the I/O hub may be serviced in an efficient manner within the system. With the snapshot of the system available, the I/O hub may then service the I/O device in an efficient manner.

In one embodiment, the invention is a method. The method includes receiving a request for a current copy of a data line. The method also includes finding the data line within a cache-coherent multi-node system. The method further includes copying the data line without disturbing a state associated with the data line. The method also includes providing a copy of the data line in response to the request. Moreover, the method includes determining if the data line is a last data line of a transaction based on a known transaction length of the transaction.

In an alternate embodiment, the invention is an apparatus. The apparatus includes an incoming request buffer to store requests relating to read and write operations, the requests including addresses to be read or written. The apparatus also includes an outgoing request buffer coupled to the incoming request buffer. The apparatus further includes bus logic to interface with a bus, the bus logic coupled to the incoming request buffer and the outgoing request buffer. The apparatus also includes control logic to interface with and coupled to the incoming request buffer, the outgoing request buffer, and the bus logic. The control logic is to identify a request to read a current copy of a data line. The control logic is also to respond to the request to read a current copy by finding a data line within a cache-coherent multi-node system. The control logic is also to receive a copy of the data line without disturbing a state associated with the data line. The control logic is also to provide the copy of the data line to a requestor originating the request, and determine whether the data line is a last data line of a transaction associated with the request based on a known transaction length of the transaction.

In another alternate embodiment, the invention is a system. The system includes a first processor, a second processor and an I/O subsystem. The system also includes a scalability port coupled through a bus to the first processor and coupled through the bus to the second processor, the scalability port further coupled through the bus to the I/O subsystem. The scalability port includes an incoming request buffer to store requests relating to read and write operations, the requests including addresses to be read or written. The scalability port also includes an outgoing request buffer coupled to the incoming request buffer. The scalability port further includes bus logic to interface with the bus, the bus logic coupled to the incoming request buffer and the outgoing request buffer. The scalability port also includes control logic to interface with and coupled to the incoming request buffer, the outgoing request buffer, and the bus logic. The control logic is to identify a request to read a current copy of a data line. The control logic is also to respond to the request to read a current copy by finding a data line within a cache-coherent multi-node system. The control logic is further to receive a copy of the data line without disturbing a state associated with the data line. The control logic is also to provide the copy of the data line to a requestor originating the request. The control logic is also to determine whether the data line is a last data line of a transaction associated with the request based on a known transaction length of the transaction.

In yet another alternate embodiment, the invention is a system. The system includes a first processor, a second processor, an I/O subsystem, and a scalability port. The scalability port is coupled through a first bus to the first processor and coupled through the first bus to the second processor, the scalability port further coupled through a second bus to the I/O subsystem. The scalability port includes an incoming request buffer to store requests relating to read and write operations, the requests including addresses to be read or written. The scalability port also includes an outgoing request buffer coupled to the incoming request buffer. The scalability port further includes bus logic to interface with the first bus and the second bus, the bus logic coupled to the incoming request buffer and the outgoing request buffer. The scalability port also includes control logic to interface with and coupled to the incoming request buffer, the outgoing request buffer, and the bus logic. The control logic is to identify a request to read a current copy of a data line. The control logic is also to respond to the request to read a current copy by finding a data line within a cache-coherent multi-node system. The control logic is further to receive a copy of the data line without disturbing a state associated with the data line. The control logic is also to provide the copy of the data line to a requestor originating the request. The control logic is further to determine whether the data line is a last data line of a transaction associated with the request based on a known transaction length of the transaction.

In another alternate embodiment, the invention is a method. The method includes requesting a current copy of a data line. The method also includes receiving a current copy of the data line. The method further includes processing the data line independently of a surrounding system. The method also includes determining whether the data line is a last data line of a transaction based on a known transaction length of the transaction.

In still another alternate embodiment, the invention is an apparatus. The apparatus includes means for receiving a request for a current copy of a data line. The apparatus also includes means for finding the data line within a cache-coherent multi-node system. The apparatus further includes means for copying the data line without disturbing a state associated with the data line coupled to the means for receiving. The apparatus also includes means for providing a copy of the data line in response to the request coupled to the means for finding the data line. The apparatus also includes means for determining whether the data line is a last data line of a transaction based on a known transaction length of the transaction.

FIG. 1 illustrates a block diagram of an embodiment of a system having multiple processors. A first processor 110 and a second processor 120 are coupled to a node controller 130, and the first processor 110 may be coupled directly to the second processor 120 as well. Memory 150 is also coupled to node controller 130. Furthermore, scalability ports 135 are used to couple node controller 130 to I/O (input/output) hub 140, which in turn may be coupled to various I/O devices (not shown). In such an embodiment, the scalability ports 135 may be used to control accesses to secondary and higher level storage devices, as well as maintain cache coherency within the system. In one embodiment, each of the processor 110, processor 120 and node controller 130 have an associated onboard cache.

Processors typically have caches incorporated within or associated with them, such that a processor may be viewed as including a cache. In multi-processor systems, it is not uncommon to have caches associated with each processor which maintain data lines in one of four states, those states being exclusive, shared, modified, or invalid. Exclusive state is for data lines in use by that processor and locked or otherwise allowed for use by that processor only within the system. Shared state is for data lines which are in use by the processor but may be used by other processors. Modified state is for data lines in use by the processor which have a data value the processor has modified from its original value. Invalid state is for data lines which have been invalidated within the cache. Invalidation may occur when a processor writes a line to memory or when another processor takes a shared line for exclusive use, thus calling into question the validity of the data in the copy of the line the first processor has.

Figure 2:
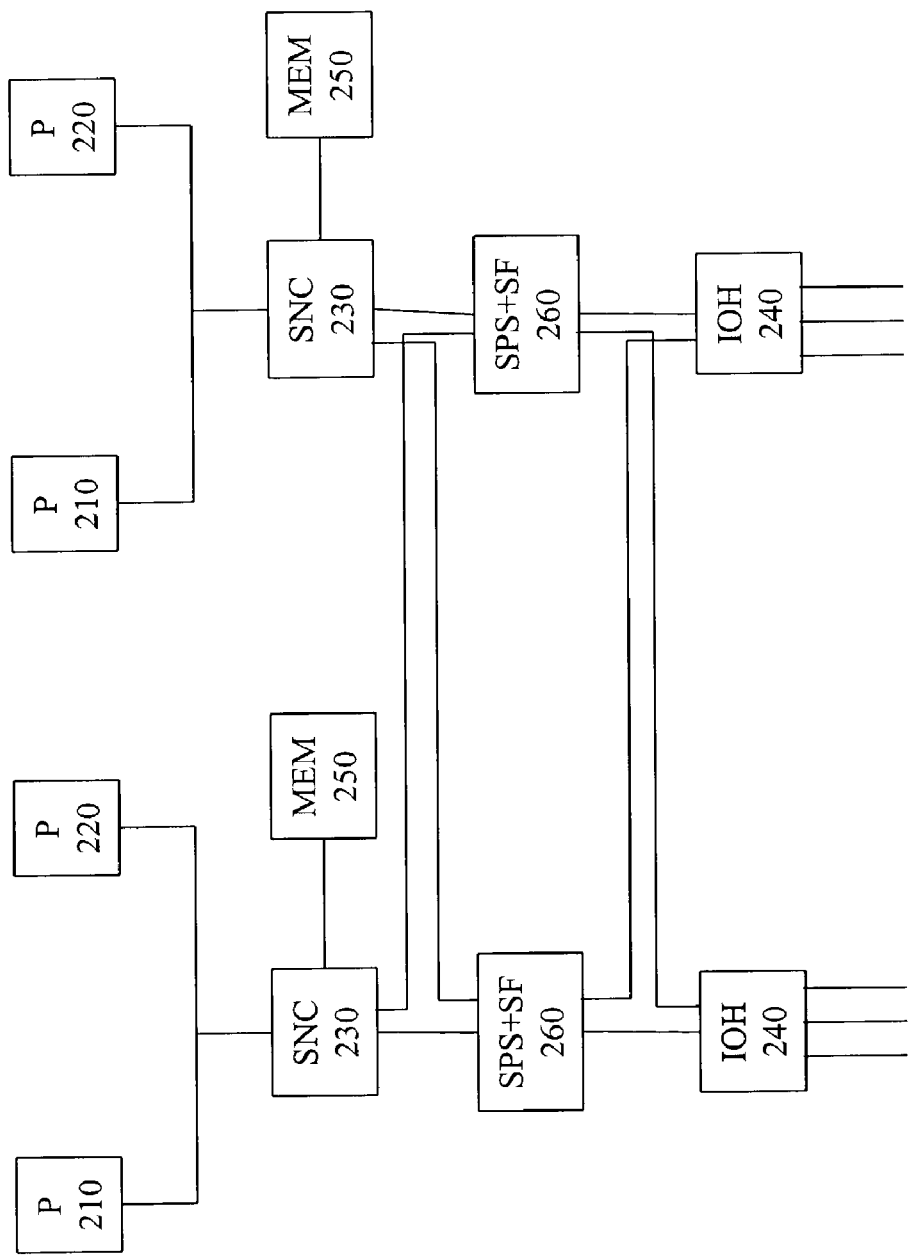
FIG. 2 illustrates a block diagram of an alternate embodiment of a system having multiple processors.

FIG. 2 illustrates a block diagram of an alternate embodiment of a system having multiple processors. A first processor 210 and a second processor 220 are coupled to a first node controller 230. Also coupled to the first node controller 230 is a first memory 250. A third processor 210 and a fourth processor 220 are coupled to a second node controller 230. Also coupled to the second node controller 230 is a second memory 250. Additionally, coupled separately to the first node controller 230 and the second node controller 230 are a first and second scalability port switch and snoop filter 260. Furthermore, coupled to each of the first and second scalability port switches 260 are a first and second I/O hub 240. In one embodiment, each of the processors 210, processors 220, node controllers 230 and I/O hubs 240 have an associated onboard cache.

In various embodiments, the snoop filter may be used to track which lines are in use at a given time. This may include maintenance of information related to which nodes have a copy of the line, the status (exclusive, shared, modified, or invalid) of a line at the various nodes, or the status of the line in the system overall. As will be appreciated, the snoop filter may or may not track all of this information, depending on design choices. Furthermore, as will be appreciated, it may not be practical or necessary in some embodiments for the snoop filter to track all of the states of a line, where only two (exclusive or shared for example) may be sufficient.

Figure 3:
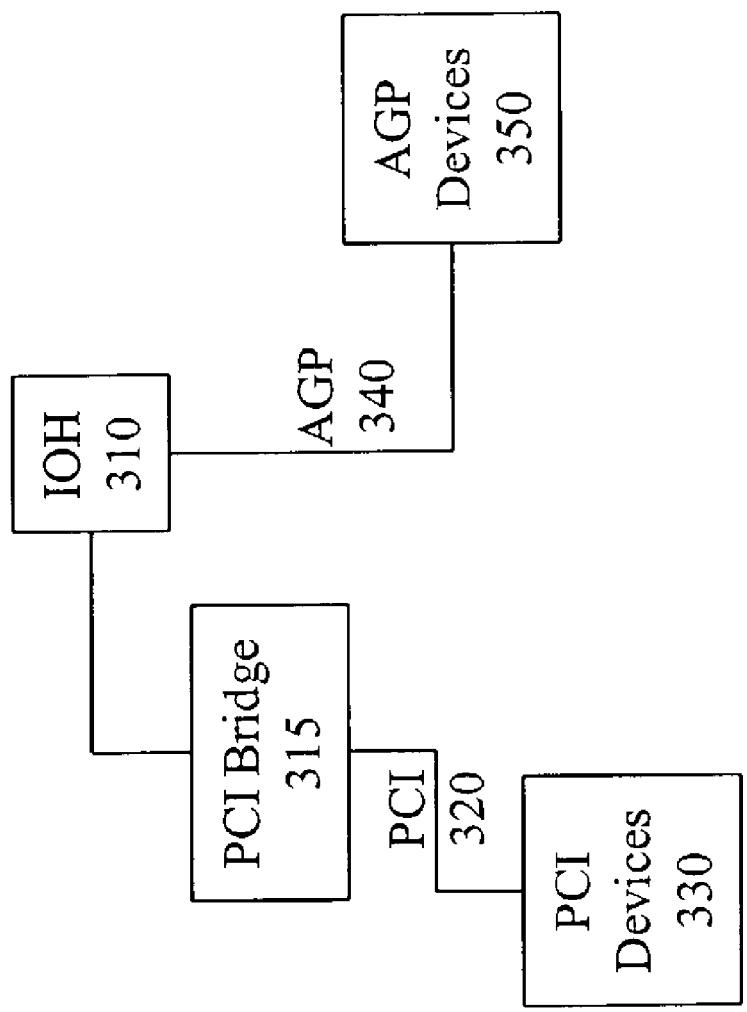
FIG. 3 illustrates a block diagram of an embodiment of an I/O (input/output) subsystem.

FIG. 3 illustrates a block diagram of an embodiment of an I/O (input/output) subsystem. I/O hub 310 is coupled to a PCI bridge 315. PCI bridge is coupled to a PCI bus 320 which in turn is coupled to a PCI device or devices 330. I/O hub 310 is also coupled to an AGP (accelerated graphics port) 340, which in turn is coupled to an AGP device or devices 350. It will be appreciated that numerous implementations of the PCI bus and the AGP exist, any of which may work with various I/O hubs such as I/O hub 310.

Figure 4:
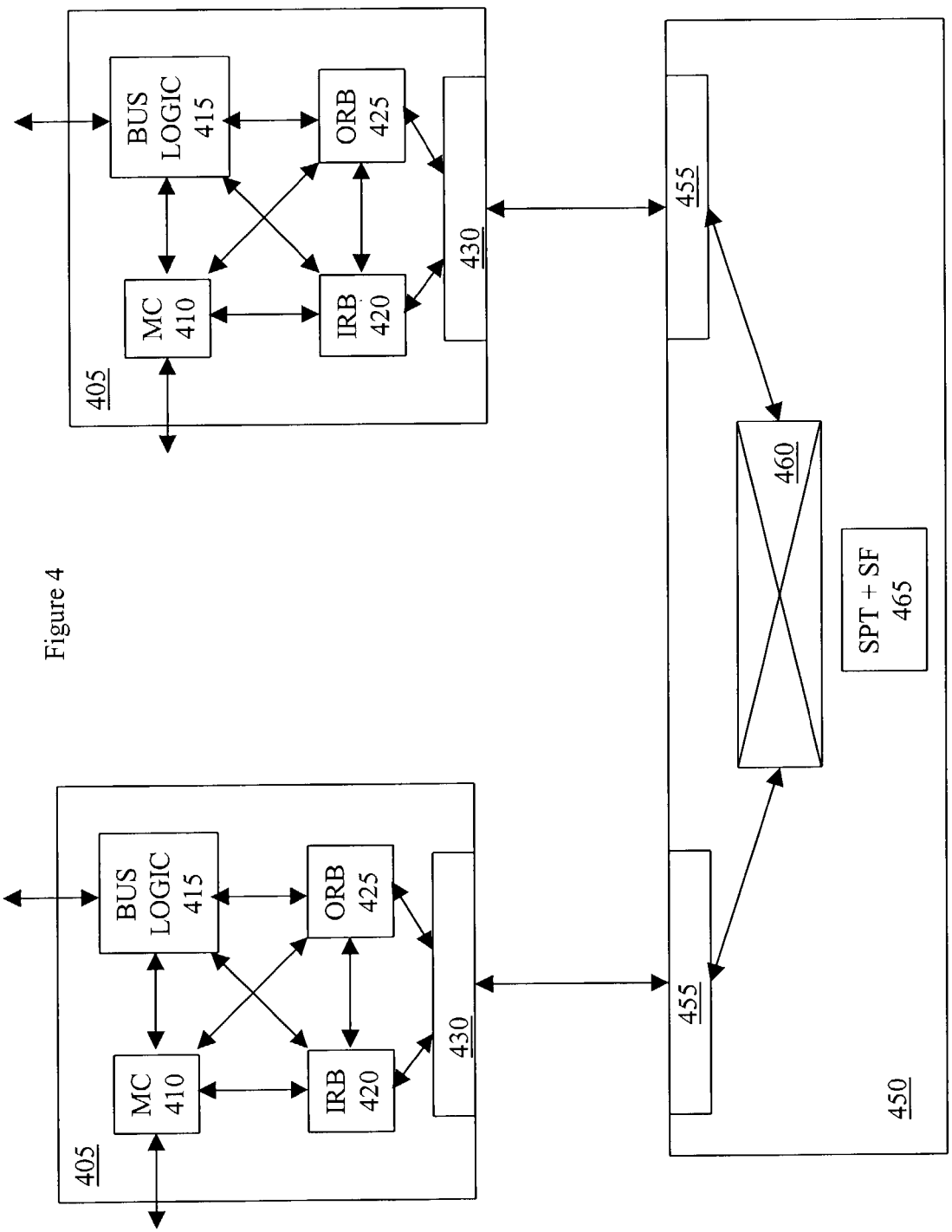
FIG. 4 illustrates a block diagram of an embodiment of a scalability port.

FIG. 4 illustrates a block diagram of an embodiment of a scalability port. The scalability port, in one embodiment, includes a first and second node controller 405 and a switch and snoop filter 450. Each node controller 405 includes a memory control block 410, a bus logic block 415, an IRB (incoming request buffer) block 420 and an ORB (outgoing request buffer) block 425, each of which is coupled to the three other components. Furthermore, the node controller 405 includes a port 430 which is coupled to the IRB 420 and the ORB 425. Also, the memory control block 410 may be coupled to a memory for interfacing therewith and the bus logic block 415 may be coupled to a first and second processor for interfacing therewith for example. The switch 450 includes a first and second port 455, each of which are coupled to a switch 460, and a snoop pending table and snoop filter block 465.

In one embodiment, incoming requests and outgoing requests are generated and responded to by devices outside the scalability port. Each request is routed through the appropriate node controller 405, such that incoming requests (to the port 430) are placed in the IRB 420 and outgoing requests (to the port 430) are placed in the ORB 425. Additionally, within the switch 450, each port 455 receives incoming and outgoing requests which are routed through the switch 460. These requests may be targeted at another node coupled to the switch 450, or may be targeted at a node coupled to another switch 450, in which case the request may either be routed to the appropriate node or ignored respectively. Determining whether the target of the request is coupled to the switch 450 is the function of the snoop filter and table 465, which may be expected to maintain information on what data (by address for example) is being utilized by the nodes coupled to the switch 450.

The scalability port may result in efficient operation using the read current access type in conjunction with I/O operations as described below. Note that the discussion of reads and writes focuses on reading and writing lines, which typically refer to lines of data such as those stored in a cache (either onboard or associated with a processor for example). It will be appreciated that lines of data may refer to various amounts of data, depending on how a system is implemented to transfer data.

Figure 5:
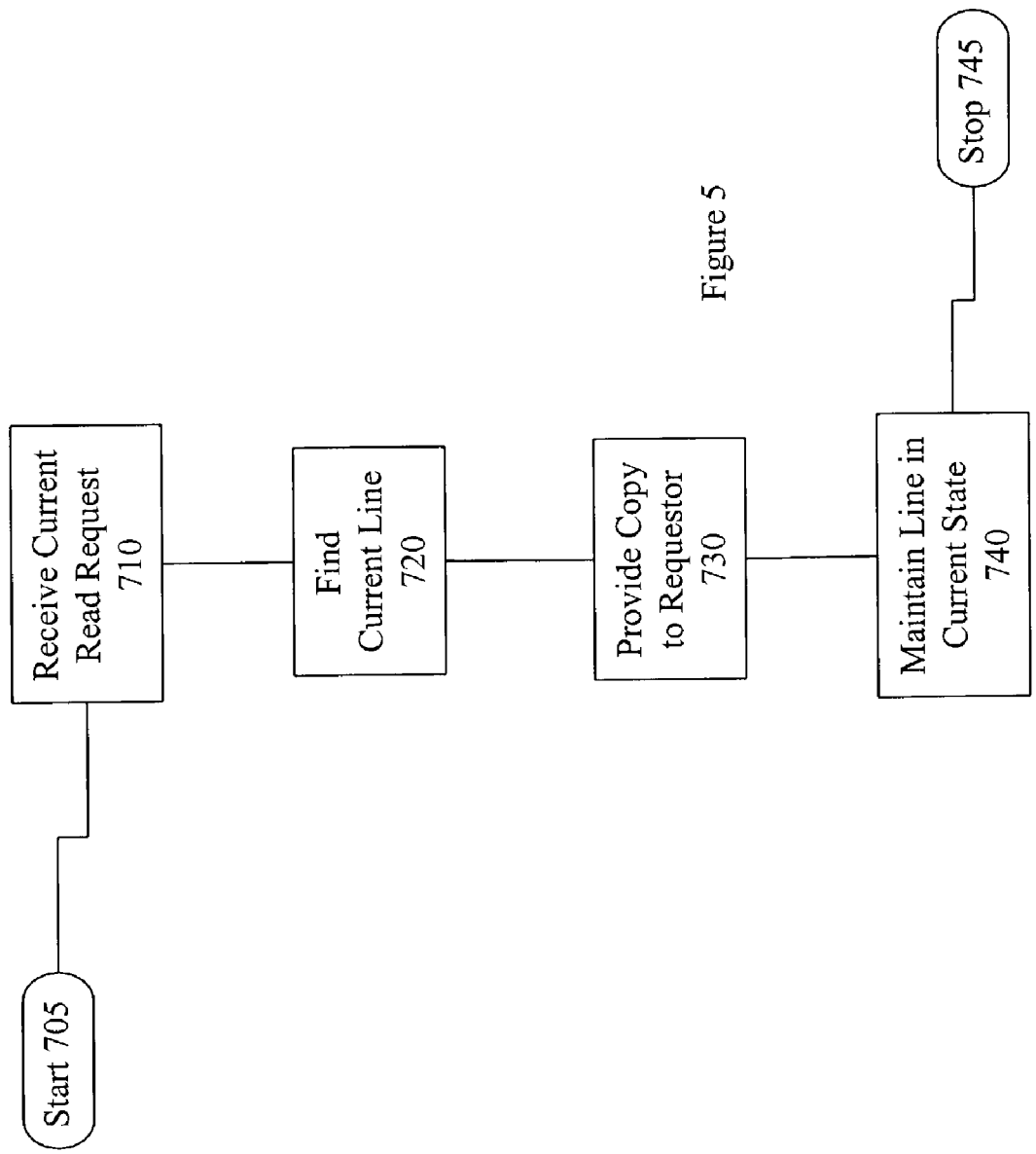
FIG. 5 illustrates a flow diagram of an embodiment of a process of providing a data line from a coherent memory system in a read current manner.

FIG. 5 illustrates a flow diagram of an embodiment of a process of providing a data line from a coherent memory system in a read current manner. The process is initiated at block 705. At block 710, a request for a current copy of a data line is received, such as by a scalability port. At block 720, a current copy of the data line is found. Finding a current copy of a data line in a multi-node architecture may be achieved in a variety of ways which will be apparent to one skilled in the art. One such method involves snooping caches in the architecture while attempting to find the data line at its known home location or home node. If one of the caches has the line, that will be found relatively quickly due to the speed of the caches. If no caches have the data line, it will be found in a time dependent on the speed of the memory in question.

At block 730, a copy of the line is provided to the requestor. Note that the copy of the line may be viewed differently from a data line otherwise in the system because copying the line for a read current operation will not affect the state of the line in the system otherwise. For example, if the line is in modified state and a current copy is supplied to the I/O subsystem, the line remains in modified state. Similarly, a line in exclusive state remains in exclusive state even though it has been copied for use by the I/O subsystem. Thus, at block 740, the line is maintained in its current state within the architecture overall, and at block 745, the process terminates. The state of the data line is specifically maintained (not disturbed) in the processor or (other) I/O hub from which the current version of the line was taken, thus allowing the system to continue operating undisturbed by the read current operation.

Maintaining the line in its current state can be useful because of how an I/O subsystem reads data. When an I/O subsystem requests a data line to be read, the I/O subsystem rarely modifies that data line as a direct result. Even if the line is in exclusive or modified state elsewhere, the I/O subsystem is not likely to corrupt the data or otherwise disrupt the system. The I/O subsystem will simply transfer the data line which was read using the read current instruction to the requesting I/O device, and not otherwise use the data line. As will be appreciated, this relates to usage of a single data line, but would typically be generalized to a situation involving multiple data lines as described below.

Figure 6:
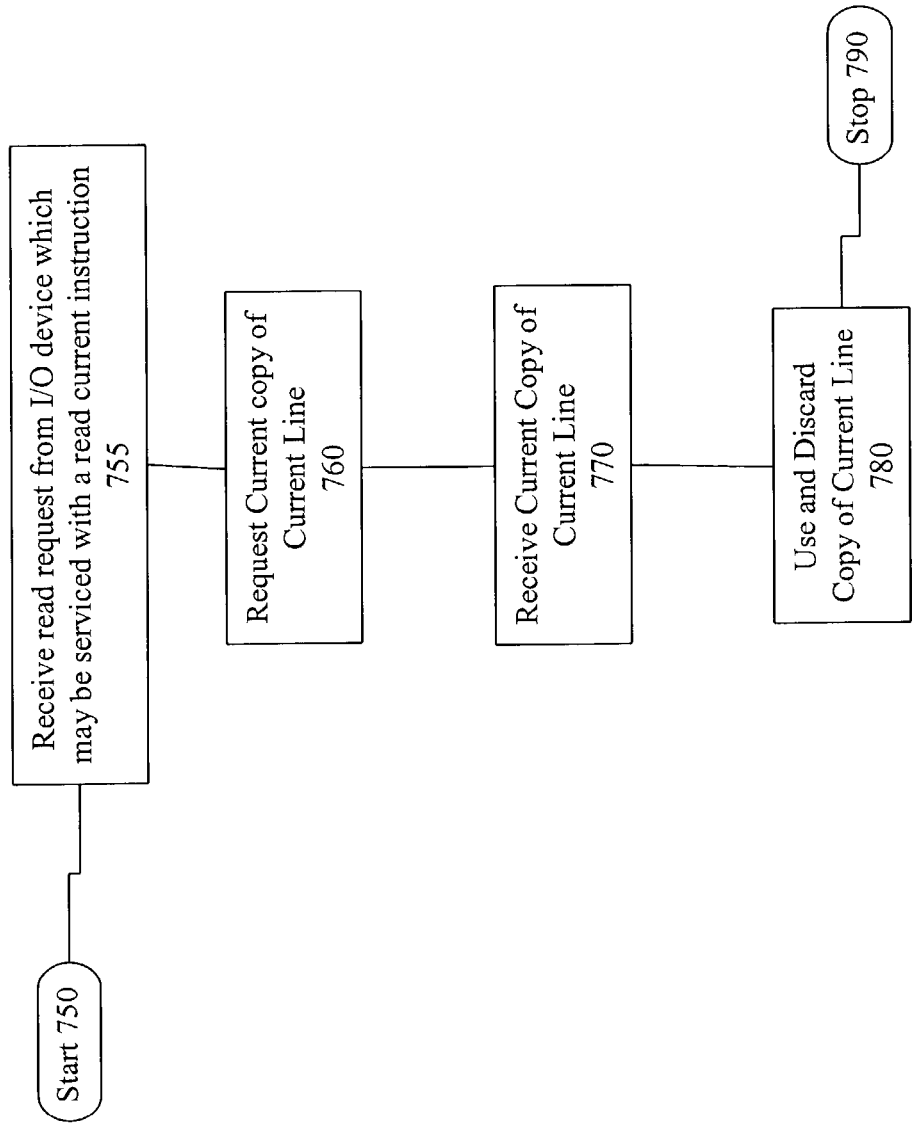
FIG. 6 illustrates a flow diagram of an embodiment of a process of utilizing a data line provided by a coherent memory system in a read current manner.

FIG. 6 illustrates a flow diagram of an embodiment of a process of utilizing a data line provided by a coherent memory system in a read current manner. The process is initiated at block 750. At block 755, a read request for an I/O device is received. This read request is one that may be satisfied using a read current instruction. A determination of whether the read request may be satisfied using a read current instruction may be made by a component of an I/O subsystem such as an I/O control hub for example. At block 760, an I/O subsystem requests a current copy of a current data line. At block 770, the I/O subsystem receives a current copy of the current data line. At block 780, the I/O subsystem uses the copy of the current data line and then discards it. At block 790, the process terminates. During this process, the state or status of the line in the rest of the system is not disturbed. Similarly, as will be appreciated, this relates to usage of a single data line, but would typically be generalized to a situation involving multiple data lines as described below.

Figure 7:
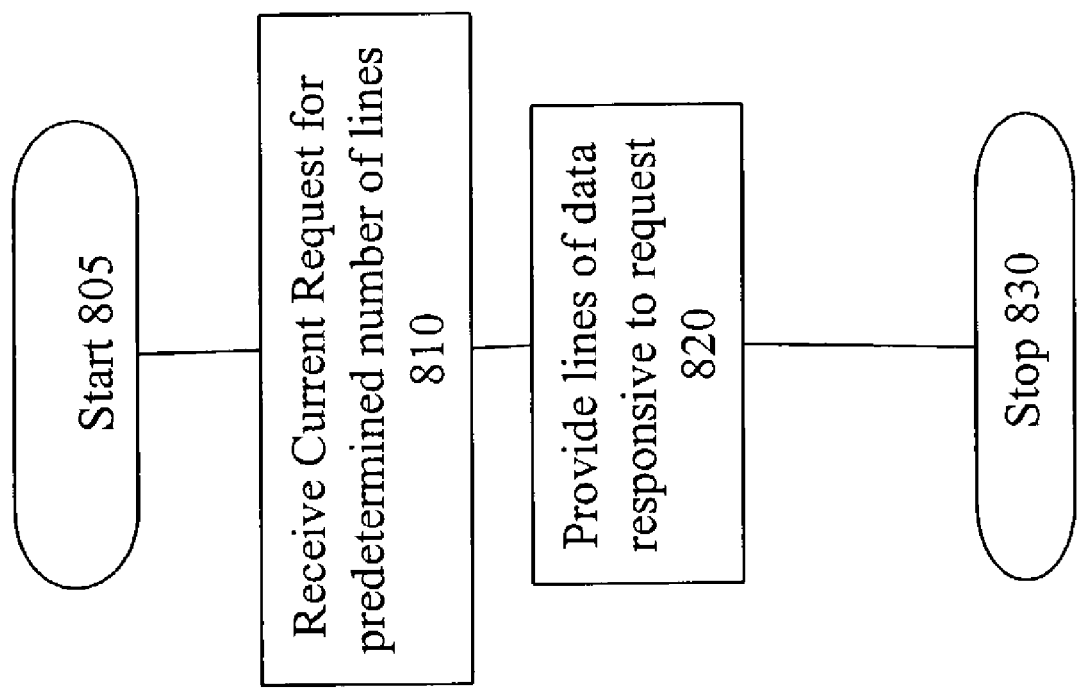
FIG. 7 illustrates a flow diagram of an embodiment of a process of providing data from a coherent memory system in a read current manner for a transaction of known length.

FIG. 7 illustrates a flow diagram of an embodiment of a process of providing data from a coherent memory system in a read current manner for a transaction of known length. At block 805, the process is initiated. At block 810, a request for a predetermined number of lines of data is received. At block 820, the request for the predetermined number of lines of data is serviced as described previously with respect to FIG. 5. As will be appreciated, block 810 and 820 may need to be repeated, depending on the implementations of the I/O subsystem and the system servicing the request(s). The request for a predetermined number of lines of data may be implemented as a set of requests for single lines of data issued in parallel. The request for a predetermined number of lines of data may also be implemented as a first set of requests for a portion of the single lines of data issued in parallel, followed by a second set of requests for a portion of the single lines of data issued in parallel for example. However, since a predetermined number of lines of data are requested, the breakdown into a set or sets of requests may be easily and predictably achieved.

Figure 8:
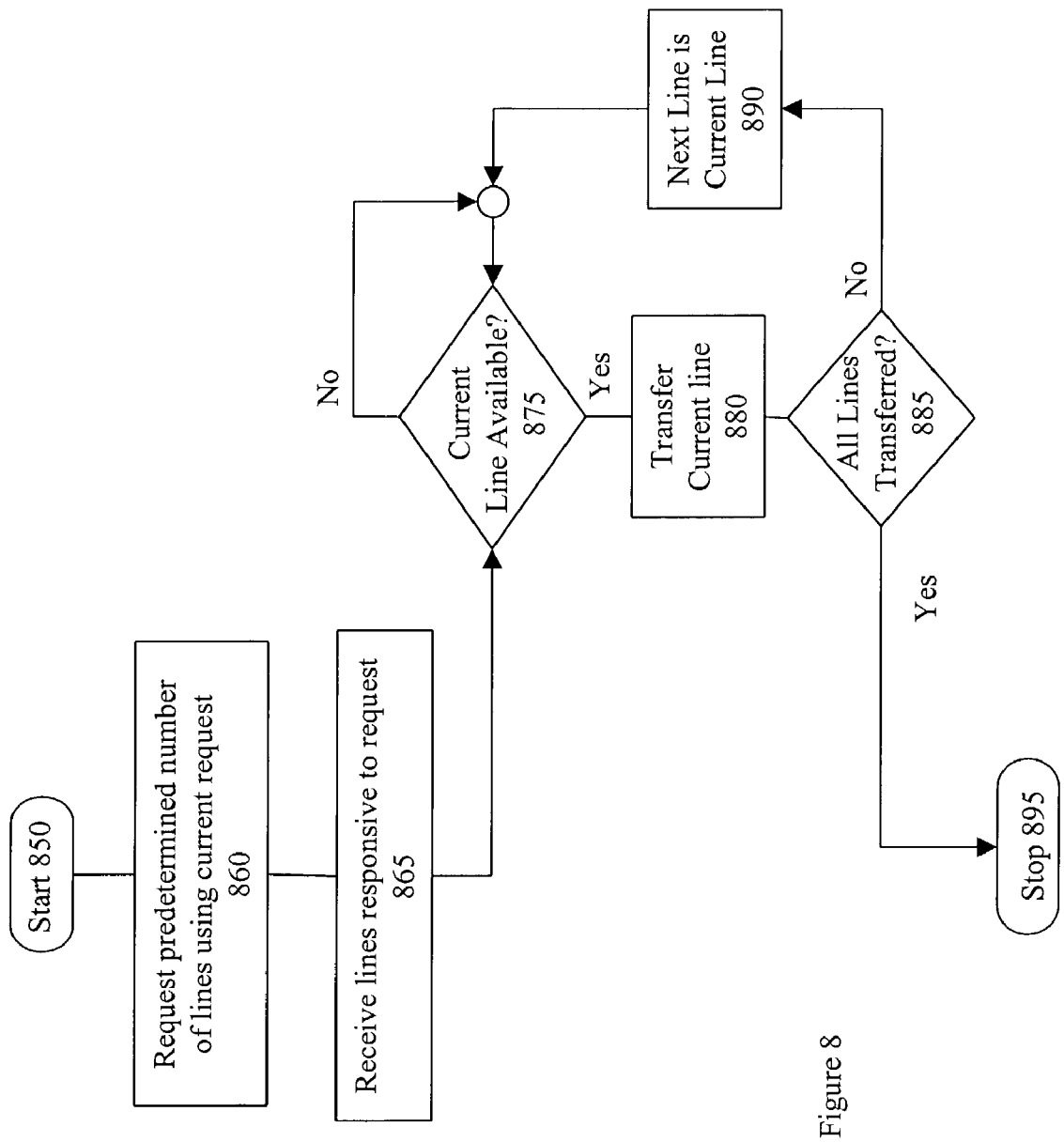
FIG. 8 illustrates a flow diagram of an embodiment of a process of utilizing data provided by a coherent memory system for a transaction of known length.

FIG. 8 illustrates a flow diagram of an embodiment of a process of utilizing data provided by a coherent memory system for a transaction of known length. At block 850, the process is initiated. At block 860, a read current request is submitted for a predetermined number of lines of data. At block 865, all or some of the requested lines of data are received. At block 875, a determination is made as to whether the data line to be transferred next to the I/O device is available. At block 880, if the data is available, it is transferred at a rate based on the available transfer mechanism (such as a PCI bus for example). At block 885, a determination is made as to whether all of the data has been transferred. If not, at block 890, the next data to be transferred becomes the current data to be transferred, and the process proceeds to block 875. Similarly, if the data to be transferred at block 875 is not available, the process loops back to block 875 until the data to be transferred is available. If the data is all transferred at block 885, the process terminates at block 895.

It will be appreciated that the process of transferring the first line of data and the next line of data to the I/O device may be achieved by an aggregate transfer of a large number of lines of data (such as the data of a page for example) rather than by serially transferring one line at a time. Furthermore, it will be appreciated that actual transfer of the data may occur on a bit-by-bit basis at some point in the process even though it appears to be transferred line-by-line or page-by-page.

Note that the read current operation provides a number of advantages. For example, a line that is read current need not result in an entry in the snoop filter of the system, as only the current version of the line is needed by the agent requesting the read. This, in turn, means that the system need not snoop the agent (such as the IOH) the next time a request for the line is made, as no entry in the snoop filter exists as a result of the read current. Furthermore, because the line need not be maintained in the buffer of the IOH as it would be in a cache, no special recordkeeping of the line or similar overhead (and accompanying bandwidth) is necessary, the line may be overwritten when it has been used, rather than requiring some form of eviction as in a normal cache. The special entry used in the IOH cache for the line read using a read current instruction effectively treats the line as though it were in a buffer, or a FIFO queue for example. As has been mentioned, no cache perturbation occurs, and the snoop filter resources (both memory and processing) are not taxed by the read current operation.

ALTERNATIVE SCALABILITY PORT IMPLEMENTATIONS

The following section addresses some of the alternative scalability port implementations which may be utilized within the spirit and scope of the invention. It will be appreciated that these are exemplary in nature rather than limiting. Other alternative embodiments will be apparent to those skilled in the art.

Figure 9:
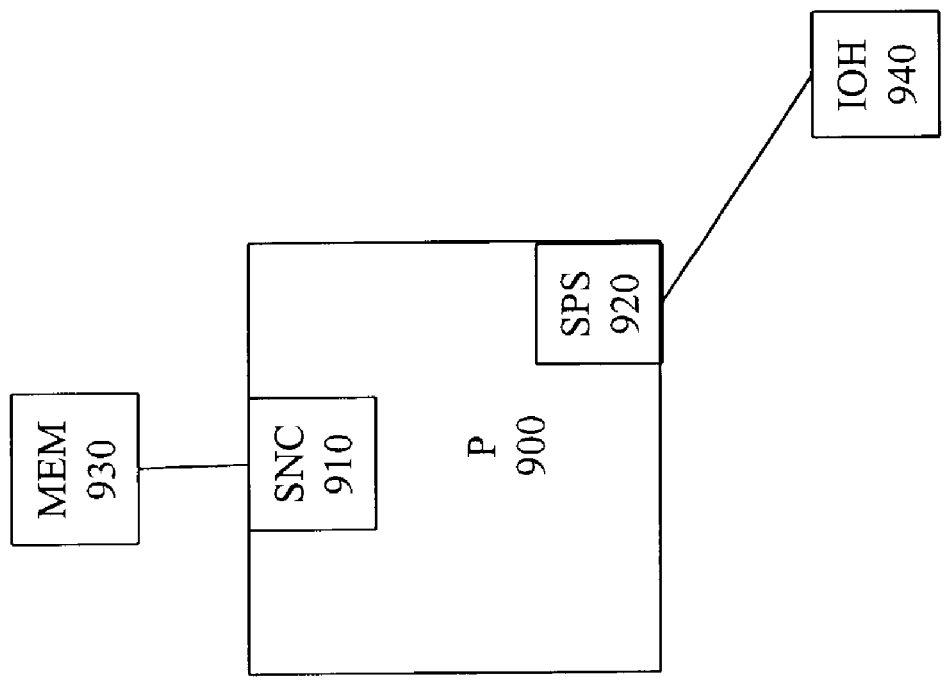
FIG. 9 illustrates a block diagram of an embodiment of a processor having portions of a scalability port integrated therein.

FIG. 9 illustrates a block diagram of an embodiment of a processor having portions of a scalability port integrated therein. Such an embodiment need not implement the protocol addressed in the previous section. In one embodiment, processor 900 includes scalability port node controller 910 and scalability port switch 920. Scalability port node controller 910 is suitable for coupling to a memory such as memory 930. Scalability port switch 920 is suitable for coupling to an I/O hub or interface such as I/O hub 940. In one embodiment, scalability port switch 920 includes a snoop filter.

Scalability port node controller 910 and scalability port switch 920 may collectively include an incoming request buffer, outgoing request buffer, memory control logic, snoop pending table and snoop filter. In one embodiment, scalability port node controller 910 includes an incoming request buffer, outgoing request buffer and memory control logic suitable for interfacing with memory 930. In such an embodiment, scalability port switch 920 may also include a snoop pending table, snoop filter and i/o interface logic suitable for interfacing with I/O hub 940. In such an embodiment, scalability port switch 920 may couple to the incoming request buffer and outgoing request buffer of scalability port node controller 910, and include i/o interface logic suitable for coupling to the I/O hub 940. As a result, the snoop filter which was previously mentioned as being implicated in the read current request may be present in the processor 900.

Figure 10:
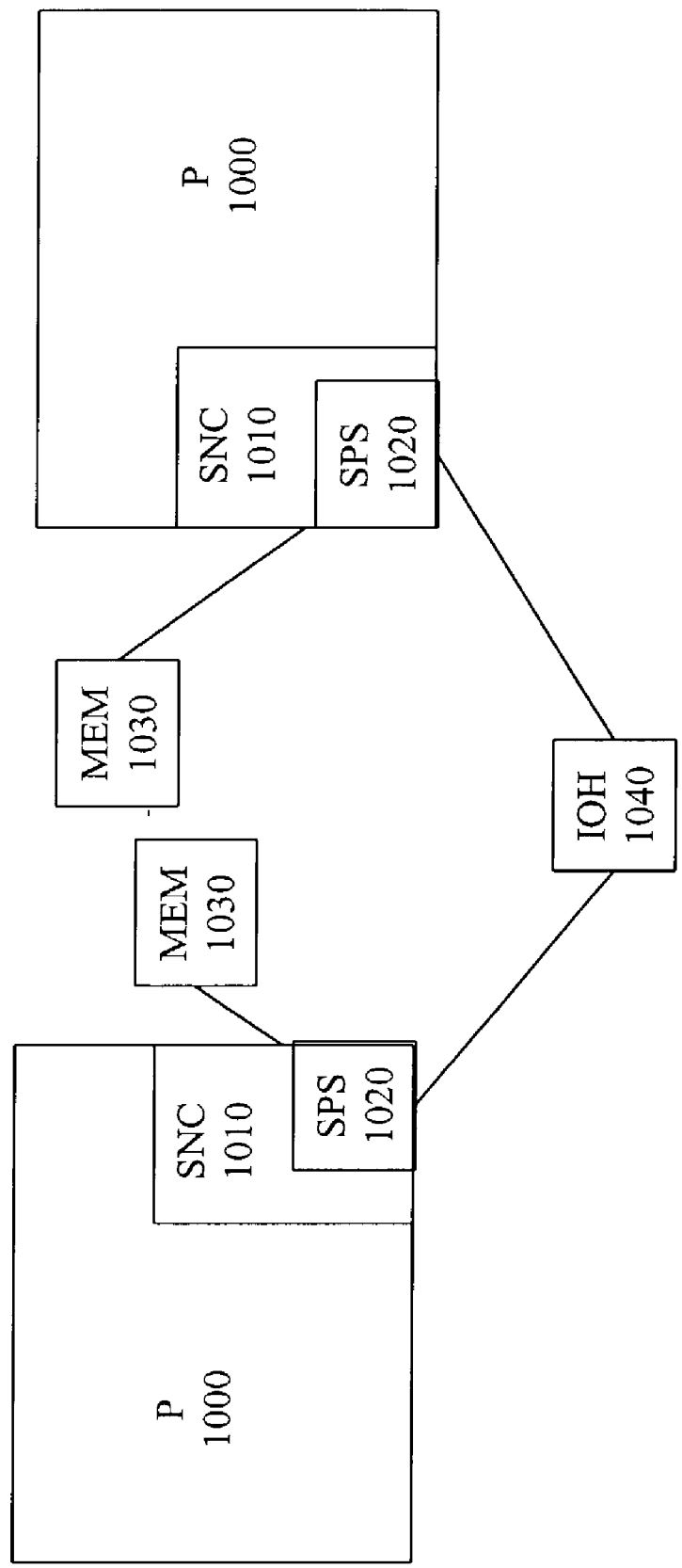
FIG. 10 illustrates a block diagram of an alternate embodiment of a processor having portions of a scalability port integrated therein.

FIG. 10 illustrates a block diagram of an alternate embodiment of a processor having portions of a scalability port integrated therein. In one embodiment, each instance of processor 1000 includes a scalability port node controller 1010 and scalability port switch 1020. In one embodiment, scalability port switch 1020 includes a snoop filter. Scalability port switch 1020 is part of scalability port node controller 1010, and collectively the two components (1010, 1020) include an incoming request buffer, outgoing request buffer, and control logic. Scalability port switch 1020 includes a snoop pending table, snoop filter, and i/o interface logic suitable for coupling to an I/O hub or other i/o device, such as I/O hub 1040. Scalability port node controller 1010 includes memory control logic suitable for interfacing with memory 1030. Note that memory 1030 may be separate for each processor 1000 or shared between two (or more)

processors 1000. Similarly to FIG. 9, the snoop filter which was previously mentioned as being implicated in the read current request may be present in the processors 1000.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 or 2 (among others) may be integrated into components, or may be subdivided into components. Similarly, the blocks of FIG. 7 or 8 (among others) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
receiving a request for a current copy of a data line from an I/O subsystem of the cache-coherent multi-node system, and the method is performed by a scalability port within the cache-coherent multi-node system;
finding the data line within a cache-coherent multi-node system;
copying the data line without disturbing a state associated with the data line;
providing a copy of the data line in response to the request without disturbing the state associated with the data line;
determining if the data line is a last data line of a transaction based on a known transaction length of the transaction; and
repeating the receiving, finding, copying, providing and determining with respect to a sequence of data lines until the determining indicates the last line of transaction has been provided.

2. The method of claim 1 wherein:
the data line is found within a cache associated with a processor in the cache-coherent multi-node system and the data line is copied from the cache associated with the processor.

3. The method of claim 2 wherein:
the cache held the data line in a shared state prior to the copying and the cache continues to hold the data line in a shared state immediately after the copying.

4. The method of claim 2 wherein:
the cache held the data line in a modified state prior to the copying and the cache continues to hold the data line in a modified state immediately after the copying.

5. The method of claim 2 wherein:
the cache held the data line in an exclusive state prior to the copying and the cache continues to hold the data line in an exclusive state immediately after the copying.

6. An apparatus comprising:
an incoming request buffer to store requests relating to read and write operations, the requests including addresses to be read or written;
an outgoing request buffer coupled to the incoming request buffer;
bus logic to interface with a bus, the bus logic coupled to the incoming request buffer and the outgoing request buffer; and
control logic to interface with and coupled to the incoming request buffer, the outgoing request buffer, and the bus logic, the control logic to identify the request to read a current copy within the incoming request buffer, the control logic to identify a request to read a current copy of a data line, the control logic to generate requests for the data line in the outgoing request buffer, the requests for the data line including an indication that the state of the data line should not change, the control logic to identify a copy of the data line received in the incoming request buffer, the control logic to respond to the request to read a current copy by finding a data line within the cache-coherent multi-node system, and determine whether the data line is a last data line of a transaction associated with the request based on a known transaction length of the transaction.

7. The apparatus of claim 6 wherein:
the bus logic coupled to route requests into the incoming request buffer and to route requests out of the outgoing request buffer.

8. A system comprising:
a first processor;
a second processor;
an I/O subsystem;
a scalability port coupled through a bus to the first processor and coupled through the bus to the second processor, the scalability port further coupled through the bus to the I/O subsystem, the scalability port including;
an incoming request buffer to store requests relating to read and write operations, the requests including addresses to be read or written;
an outgoing request buffer coupled to the incoming request buffer;
bus logic to interface with the bus, the bus logic coupled to the incoming request buffer and the outgoing request buffer; and
control logic to interface with and coupled to the incoming request buffer, the outgoing request buffer, and the bus logic, the control logic to identify a request to read a current copy of a data line, the control logic to respond to the request to read a current copy by finding a data line within a cache-coherent multi-node system, receive a copy of the data line without disturbing a state associated with the data line, provide the copy of the data line to a requestor originating the request, wherein the requestor originating the request to read a current copy must be the I/O subsystem, without disturbing the state associated with the data line, and determine whether the data line is a last data line of a transaction associated with the request based on a known transaction length of the transaction.

9. The system of claim 8 wherein:
the copy of the data line must originate from the first processor.

10. A system comprising:
a first processor;
a second processor;
an I/O subsystem;
a scalability port coupled through a first bus to the first processor and coupled through the first bus to the second processor, the scalability port further coupled through a second bus to the I/O subsystem, the scalability port including:
an incoming request buffer to store requests relating to read and write operations, the requests including addresses to be read or written;
an outgoing request buffer coupled to the incoming request buffer;
bus logic to interface with the first bus and the second bus, the bus logic coupled to the incoming request buffer and the outgoing request buffer; and
control logic to interface with and coupled to the incoming request buffer, the outgoing request buffer, and the bus logic, the control logic to identify a request to read a current copy of a data line, the control logic to respond to the request to read a current copy by finding a data line within a cache-coherent multi-node system, receive a copy of the data line without disturbing a state associated with the data line, provide the copy of the data line to a requestor originating the request, wherein the requestor originating the request to read a current copy must be the I/O subsystem, without disturbing the state associated with the data line, and determine whether the data line is a last data line of a transaction associated with the request based on a known transaction length of the transaction.

11. The system of claim 10 wherein:
the copy of the data line must originate from the first processor.

12. The system of claim 11 wherein:
the copy of the data line is held in an exclusive state within a cache of the first processor prior to finding the data line and after receiving the data line.

13. The system of claim 11 wherein:
the copy of the data line is held in a shared state within a cache of the first processor prior to finding the data line and after receiving the data line.

14. The system of claim 11 wherein:
the copy of the data line is held in a modified state within a cache of the first processor prior to finding the data line and after receiving the data line.

15. The system of claim 11 wherein:
the copy of the data line is held in a shared state within a cache of the first processor prior to finding the data line and after receiving the data line and the copy of the data line is held in a shared state within a cache of the second processor prior to finding the data line and after receiving the data line.

16. The system of claim 11 wherein:
the copy of the data line is held in an invalid state within a cache of the second processor prior to finding the data line and after receiving the data line.

17. A method comprising:
requesting a current copy of a data line;
receiving a current copy of a data line;
processing the data line independently of a surrounding system;
determining whether the data line is a last data line of a transaction based on a known transaction length of the transaction;
the requesting, receiving, processing and determining are performed within an input/output subsystem of the surrounding system, the request is made of a scalability port and the data line is received from the scalability port.

18. The method of claim 17 further comprising:
discarding the data line upon completion of the processing.

19. An apparatus comprising:
means for receiving a request for a current copy of a data line;
means for finding the data line within a cache-coherent multi-node system;
means for copying the data line without disturbing a state associated with the data line coupled to the means for receiving;
means for providing a copy of the data line in response to the request without disturbing the state associated with the data line coupled to the means for finding the data line;
means for determining whether the data line is a last data line of a transaction based on a known transaction length of the transaction; and
the means for copying, means for providing, means for determining, means for receiving and means for finding are controlled by a control means for coordinating operations of the means for copying, means for providing, means for determining, means for receiving, and means for finding, the control means coupled to each of the means for providing, means for finding, means for determining, means for receiving and means for copying.

20. The apparatus of claim 19 wherein:
the means for copying is further for receiving the copy of the data line.

21. The apparatus of claim 19 wherein:
the control means further for causing the means for providing, means for finding, means for determining, means for receiving, and means for copying to operate upon a sequence of data lines until the last data line of the transaction is provided.

* * * * *